United States Patent [19]

Sinka et al.

[11] 4,417,023
[45] Nov. 22, 1983

[54] POLYSILOXANE STABILIZERS FOR FLATTING AGENTS IN RADIATION HARDENABLE COMPOSITIONS

[75] Inventors: Joseph V. Sinka, Mendham; Robert A. LieBerman, Hopatcong, both of N.J.

[73] Assignee: Diamond Shamrock Corporation, Dallas, Tex.

[21] Appl. No.: 347,512

[22] Filed: Feb. 10, 1982

Related U.S. Application Data

[63] Continuation-in-part of Ser. No. 341,301, Jan. 21, 1982, abandoned.

[51] Int. Cl.$^3$ ................................................ C08F 2/48
[52] U.S. Cl. .............................. 524/731; 204/159.13; 204/159.23; 524/714; 524/719; 524/720
[58] Field of Search .................... 204/159.13, 159.23; 524/731

[56] References Cited

U.S. PATENT DOCUMENTS

| | | | |
|---|---|---|---|
| 2,268,273 | 1/1942 | Wilkes et al. | 428/274 |
| 3,518,288 | 6/1970 | Halvska | 521/111 |
| 3,594,410 | 7/1971 | Cohen et al. | 260/486 R |
| 3,669,608 | 6/1972 | Wegmuller | 8/54 |
| 3,783,004 | 1/1974 | Parker | 117/93.31 |
| 3,857,822 | 12/1974 | Frass | 96/115 |
| 3,918,393 | 11/1975 | Hahn | 204/159.16 |
| 4,036,790 | 7/1977 | Thomson | 521/159 |
| 4,048,036 | 9/1977 | Prucnal | 204/159.23 |
| 4,058,443 | 11/1977 | Murata et al. | 204/159.17 |
| 4,088,498 | 5/1978 | Faust | 204/159.15 |
| 4,101,464 | 7/1978 | Kamens et al. | 521/88 |
| 4,113,593 | 9/1978 | Barzynski | 204/159.15 |
| 4,143,013 | 3/1979 | Jenkinson et al. | 204/159.13 |
| 4,169,167 | 9/1979 | McDowell | 204/159.15 |
| 4,170,663 | 10/1979 | Hahn et al. | 204/159.19 |
| 4,177,074 | 12/1979 | Proskow | 430/286 |
| 4,177,333 | 12/1979 | Riccitiello et al. | 521/124 |
| 4,179,478 | 12/1979 | Rosenkranz et al. | 525/113 |
| 4,180,474 | 12/1979 | Schuster et al. | 204/159.14 |
| 4,184,021 | 1/1980 | Frosch et al. | 521/106 |
| 4,216,267 | 8/1980 | Lorenz et al. | 204/159.13 |

OTHER PUBLICATIONS

"Synthesis . . . Siloxane–Polyether . . . " Industrial & Eng. Chem., Jun. 1967, pp. 88–92.

*Primary Examiner*—Melvyn L. Marquis
*Assistant Examiner*—A. H. Koeckert
*Attorney, Agent, or Firm*—Neal T. Levin

[57] ABSTRACT

Flatting agents, such as silica, talc and carbonates are present in radiation hardenable compositions in order to reduce gloss and obtain a flat appearance in cured coating. However, the flatting agent settles in the radiation-hardenable composition. To reduce settling of the flatting agent, one or more stabilizers are added to the composition. Useful stabilizers are alkylene oxide adducts of particular siloxane copolymers.

2 Claims, No Drawings

POLYSILOXANE STABILIZERS FOR FLATTING AGENTS IN RADIATION HARDENABLE COMPOSITIONS

CROSS REFERENCE TO RELATED APPLICATION

This application is a continuation-in-part of copending application U.S. Ser. No. 341,301—Sinka et al—filed Jan. 21, 1982 now abandoned.

BACKGROUND OF THE INVENTION

1. Field of the Invention

This invention relates to stabilization of flatting agents present in radiation-hardenable compositions.

2. Description of the Prior Art

Radiation-hardenable compositions, particularly for coating applications, are known in the art. In many coating applications the cured coating has undesired gloss. One of the ways to reduce gloss and to obtain a flat appearance is to incorporate flatting agents into the radiation-hardenable composition such as silica, talc carbonates etc. See for example the following U.S. Pat. Nos:

3,783,004—Parker—Jan. 1, 1974
3,918,393—Hahn—Nov. 11, 1975
4,048,036—Prucnal—Sept. 13, 1977
4,169,167—McDowell—Sept. 25, 1979
4,170,663—Hahn et al—Oct. 9, 1979

However, the flatting agent settles in the composition. This is undesirable because the cured coating lacks a uniform appearance. Agitation prior to curing to avoid settling before use is unsatisfactory.

SUMMARY OF THE INVENTION

Radiation-hardenable compositions containing flatting agents and characterized by reduced settling of the flatting agent are those containing one or more stabilizers which are particular alkylene oxide adducts and particular quaternary ammonium salts.

These stabilizers are present in an amount sufficient to reduce settling of the flatting agent. Generally, there is from about 0.1% to about 5.0%, preferably about 0.5% to about 2.0%, percent by weight of stabilizer based upon the weight of the total radiation-hardenable composition.

DESCRIPTION OF THE PREFERRED EMBODIMENTS

STABILIZERS

More specifically, the stabilizers are those which can be one or more of the following.

(a) Alkylene oxide adducts of ethylene diamine.

These alkylene oxide adducts are represented by the following structure:

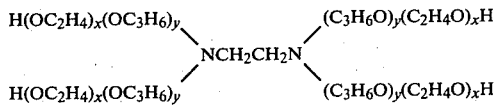

where x is an integer of from about 5 to about 25 and y is an integer of from about 10 to about 25.

Examples of these adducts are: ethylenediamine condensed first with about 80 moles of propylene oxide and then condensed with about 20 moles of ethylene oxide, the propylene oxide and ethylene oxide being in a weight ratio of 4:1 and ethylenediamine condensed first with about 60 moles of propylene oxide and then condensed with about 40 moles of ethylene oxide, the propylene oxide and ethylene oxide being in a weight ratio of 3:2.

(b) Imidazoline quaternary salts, including 1-hydroxyalkyl 2-hydrocarbyl imidazoline quaternary salts, having the formula:

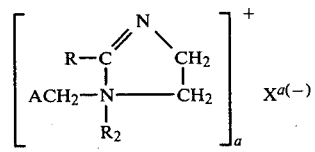

wherein:

R is hydrocarbon radical having 9 to 23 carbon atoms, A is $R_1$—OH or $CH_2NHCOR'$ where R' is an alkyl group having from 1 to 17 carbon atoms such as octyl and heptadecyl, $R_1$ is —$CH_2$— or

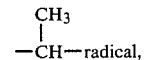

$R_2$ is hydrogen, an unsubstituted or hydroxy-substituted aliphatic hydrocarbon radical having 1 to 6 carbon atoms or a benzyl radical, X is a water-soluble anion and a is a number equal to the ionic valence of the anion, X. Compounds of this general formula may be made by quaternizing (e.g., with a $C_1$-$C_6$ hydrocarbon or benzyl halide or sulfate) an imidazoline produced by the dehydration cyclization of (a) an amide resulting from the reaction of a $C_{10}$ to $C_{24}$ aliphatic hydrocarbonoic acid and either 2-hydroxyethyl ethylene diamine or 2-hydroxy-isopropyl ethylene diamine as described in U.S. Pat. Nos. 2,268,273 and 3,669,608 or (b) a diamide resulting from the reaction of a $C_{10}$ to $C_{24}$ aliphatic hydrocarbonic acid and diethylenetriamine.

In the imidazoline compounds used herein, the $C_9$-$C_{23}$ aliphatic hydrocarbon radical, R, may be: saturated or unsaturated; linear, branched, or cyclic; and comprised of a mixture of the $C_9$-$C_{23}$ hydrocarbons. Illustrative of acids that may be used in producing the compounds and form the hydrocarbon radical thereof are lauric, palmitic, stearic, erucic, oleic, linoleic, linolenic and tallow acids. As will be appreciated, the commercial technical grades of these and other acids, which may be used to produce the imidazoline compounds described herein, normally contain considerable minor quantities of hydrocarbons outside the $C_{10}$ to $C_{18}$ range. Therefore, the imidazoline compounds prepared from such acids may contain minor quantities of compounds having 2-hydrocarbyl groups having less than 9 carbons or more than 23 carbons.

$R_2$ is any unsubstituted or hydroxysubstituted hydrocarbon radical having 1 to 6 carbon atoms that is linear, branched, or cyclic, and either saturated or unsaturated, or may be a benzyl radical when the imidazoline compounds used are produced by quaternarization as for example, with a $C_1$-$C_6$ hydrocarbon or benzyl halide or sulfate or with an active epoxide such as ethylene or propylene oxide.

The anion, X, is not critical and may be $Cl^-$, $Br^-$, $CH_3COO^-$, $C_2H_5SO_4^-$, $CH_3SO_4^-$, or like anion. Generally preferred, because of their lower costs, are the chloride, methosulfate and ethosulfate anions.

Examples of the foregoing are oleic and tall oil hydroxyethyl imidazoline quaternized with diethyl sulfate and 1-(2-stearamidoethyl)-2-heptadecyl-3-ethyl imidazolinium ethosulfate.

(c) Morpholinium quaternary salts having the following structure:

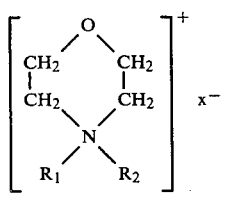

wherein X is a polar anion including $OSO_3C_2H_5$, $CH_3(CH_2)_{16}COO^-$, $Cl^-$, $Br^-$ or the like, $R_1$ is a long chain alkyl containing from 12 to 22 carbon atoms, preferably from 12 to 18 carbon atoms and $R_2$ is a short chain alkyl having from 1 to 5 carbon atoms and derives from the anion that form the quaternary ammonium salt.

Examples of these quaternary salts are N-cetyl, N-ethyl morpholinium ethosulfate and N-soya, N-ethyl morpholinium sulfate.

(d) Tertiary amines having the following structure:

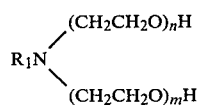

wherein $R_1$ is alkyl containing from 12 to 22 carbon atoms and $m+n$ totals between 2 and 20.

Examples of these tertiary amines are:

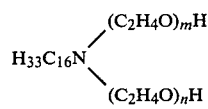

wherein $m+n$ is 10, available under the trademark Ethomeen C-20 and

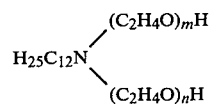

wherein $m+n$ is 5, available under the trademark Ethomeen C-15. Another example is tallow amine condensed with two moles of ethylene oxide.

Quaternary salts of the above tertiary amines may also be used. Examples of quaternizing agents are dimethyl sulfate diethyl sulfate, methyl chloride, benzyl chloride, etc. Examples are the dietyl sulfate quaternary salt of cocoamine condensed with two moles of ethylene oxide and the diethyl quaternary salt of tallow amine condensed with 15 moles of ethylene oxide.

(e) Quaternary salts of tertiary amines having the following structure:

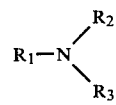

where $R_1$ is an alkyl group containing from 12 to 22 carbon atoms, $R_2$ and $R_3$ are H, methyl, ethyl or propyl and $R_2$ and $R_3$ can be the same or different.

Examples of $R_1$ are lauryl, myristyl, palmityl and stearyl. Useful quaternizing agents are dimethylsulfate, diethyl sulfate, methyl chloride, benzyl chloride etc. Examples of the foregoing are the diethyl sulfate quaternary salt of $C_{16}$ dimethyl tertiary amine and the benzyl chloride quaternary salt of $C_{12}$ dimethyl tertiary amine.

(f) Alkylene oxide adducts of siloxane copolymers having the following structure:

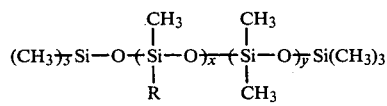

where x is an integer of from about 1 to about 30 and y is an integer of from about 5 to about 100 and the siloxane backbone (excluding R) has a molecular weight of about 500 to about 10,000 and constitutes about 10% to about 70% by weight of the total molecule. The positioning of the

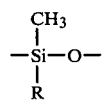

fragment is generally random.

R is $-CH_2-CH_2-CH_2-O+CH_2CH_2-O)_{\overline{a}}$

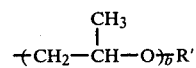

where a is an integer of from 0 to about 70, b is an integer of from 0 to about 50 and the ethylene oxide and propylene oxide fragments are present in molar ratios of 0:100 to 100:0. Where both ethylene oxide and propylene oxide fragments are present in R, their positioning can be either random or block. R has a molecular weight of about 400 to about 5,000. R' is H or a hydroxyl blocking group. The blocking group is not critical. Thus, R' can be for example, straight or branched chain alkyl of 1 to 20 carbon atoms such as methyl, ethyl, propyl, isopropyl, amyl, octyl, isooctyl and decyl; aromatic such as phenyl and substituted aromatic such as tolyl and acyl having from 1 to 18 carbons such as acetyl, propionyl and stearoyl.

These materials are prepared by well known reactions between allyl terminated polyethers and siloxanes containing Si—H groups. For example, this reaction can be carried out at temperatures between 85° C. to 145° C. over a platinum catalyst with a 20% excess of polyether. Optionally, this reaction can be carried out in the presence of a solvent such as xylene.

The siloxane which contains Si—H groups is prepared by equilibrating a mixture of hydrogen methyl polysiloxane of approximately 5,000 molecular weight, hexamethyldisiloxane and octamethylcyclotetrasiloxane (cyclic tetramer of dimethylsiloxane) in a mole ratio which depends on the desired values of x and y. Equilibration is carried out at room temperature using trifluoromethanesulfonic acid as catalyst.

Specific examples are where:

A.
1. The siloxane backbone has a molecular weight of 1,000; $x=3$ and $y=11$.
2. R has a molecular weight of 500.
3. R consists of ethylene oxide moieties only.
4. The siloxane backbone constitutes 60% by weight of the total molecule.
5. R' is acetyl.

B.
1. The siloxane backbone has a molecular weight of 1,000; $x=3$ and $y=11$.
2. R has a molecular weight of 1,200.
3. The ethylene oxide and propylene oxide fragments are present in a molar ratio of 1:1.
4. The ethylene oxide/propylene oxide fragment is a random copolymer.
5. The siloxane backbone constitutes 20% by weight of the total molecule.
6. R' is hydrogen.

C.
1. The siloxane backbone has a molecular weight of 1,000; $x=3$ and $y=11$.
2. R has a molecular weight of 1,200.
3. The ethylene oxide and propylene oxide fragments are present in a molar ratio of 1:3.
4. The ethylene oxide/propylene oxide fragment is a random copolymer.
5. The siloxane backbone constitutes 20% by weight of the total molecule.
6. R' is hydrogen.

D.
1. The siloxane backbone has a molecular weight of 3,000; $x=6$; $y=36$.
2. R has a molecular weight of 1,800.
3. The ethylene oxide and propylene oxide fragments are present in a molar ratio of 1:1.
4. The ethylene oxide/propylene oxide fragment is a random copolymer.
5. The siloxane backbone constitutes 20% by weight of the total molecule.
6. R' is H.

E.
1. The siloxane backbone has a molecular weight of 5,000; $x=15$; $y=55$.
2. R has a molecular weight of 1,200.
3. The ethylene oxide and propylene oxide fragments are present in a molar ratio of 1:1.
4. The ethylene oxide/propylene oxide fragment is a random copolymer.
5. The siloxane backbone constitutes 20% by weight of the total molecule.
6. R' is H.

F.
1. The siloxane backbone has a molecular weight of 1,000; $x=3$; $y=11$.
2. R has a molecular weight of 1,200.
3. The ethylene oxide and propylene oxide fragments are present in a molar ratio of 1:1.
4. The ethylene oxide/propylene oxide fragment is a block copolymer.
5. The siloxane backbone constitutes 20% by weight of the total molecule.
6. R is H.

In the above examples the molecular weight of the siloxane backbone excludes the molecular weight of R.

FLATTING AGENTS

Useful flatting agents are silica, talc, titanium dioxide, carbonates such as sodium carbonate and calcium carbonate and barytes. They are usually present in an amount sufficient to reduce the gloss or luster of the cured coating. Generally there is present from about 1.0 to about 20 percent by weight of flatting agent based upon the weight of the total radiation curable composition. A useful flatting agent is the precipitated silica described below and which is also the silica used in the examples appearing below. It has the following specifications:

| | |
|---|---|
| Heat loss at 105° for 2 hours (max. % as packaged) | 5% |
| pH (5% solution) | 6.5–7.5 |
| Brightness (GE) | 91–93% |
| Refractive index | 1.44 |
| Mean particle diameter | 22 millimicrons |
| Oil absorption | 170–190 cc/100 grams |
| Specific gravity | 2.0 |
| Particle size range is from 0.5 t0 13 microns with 63% being less than 2.5 microns | |

RADIATION-HARDENABLE COMPOSITIONS

The radiation-hardenable compositions which are used as coatings and which contain flatting agents are well known. They generally contain oligomers and acrylate diluents (monomers).

The radiation-hardenable compositions may be hardened by means of high-energy radiation, such as UV-light, electron beams, gamma rays etc., preferably by UV-light.

In cases where polymerization is carried out with UV-light, a photoinitiator is used and may be any one of the compounds normally used for this purpose, for example, benzophenone and, quite generally, aromatic keto compounds derived from benzophenone, such as alkyl benzophenones, halogen-methylated benzophenones, Michler's ketone, anthrone and halogenated benzophenones. Other effective photoinitiators are anthraquinone and many of its derivatives, for example β-methyl anthraquinone, tertiary-butyl anthraquinone and anthraquinone carboxylic acid esters, chlorosulphonated xanthones and thioxanthones and also oxime esters. Other useful photoinitiators are benzoin ethers such as benzoin methyl ether, benzoin ethyl ether, benzoin butyl ether, benzil ketals such as benzil and acetophenone derivatives such as diethoxyacetophenone. These photoinitiators may be used in quantities of from 0.2 to 10 percent by weight, preferably in quantities of from 1 to 5 percent by weight based on the total composition. They may be used either individually or in combination with one another.

Advantageous additives which can produce a further increase in reactivity are certain tertiary amines such as triethylamine, aminoacrylates such as 2 (n-butoxy) ethyl 4-dimethylamino benzoate and amine synergist compounds. Additions of phosphines or thioethers are similarly active. The above-mentioned substances are preferably used in quantities of from 0 to 20 percent by weight, based on the total composition.

Like any system capable of vinyl polymerization, the radiation-hardenable resin compositions have present polymerization inhibitors in order to obtain high stability in storage. Suitable compounds are phenols, for example, hydroquinone, toluhydroquinone, di-tertiary-butyl-p-cresol, hydroquinone monomethyl ether and also phenothiazine or copper compounds. The quantity to be added is determined by the required degree of stabilization and also by the acceptable losses of reactivity which are frequently incurred by the addition of stabilizers. The type of optimum quantity of stabilizer must be determined by concentration tests to be carried out from case to case with varying concentrations of stabilizer. The stabilizers are generally added in quantities of from 0.001 to 0.5 percent by weight, based on the total composition.

Examples of oligomers are reaction products of at least one polyepoxide containing more than one 1,2-epoxide group per molecule and acrylic or methacrylic acid or mixtures thereof, about 0.6 to 1 mole of carboxyl groups having been used to one epoxide group. The polyepoxides may be pre-extended (polyfunctional) compounds) or modified (monofunctional compounds) with ammonia, aliphatic or cycloaliphatic primary or secondary amine, with hydrogen sulphide, aliphatic, cycloaliphatic, aromatic or aliphatic dithiols or polythiols, dicarboxylic acid and polycarboxylic acids, from 0.01 to 0.6 NH or SH or COOH equivalents per one epoxide equivalent. The reaction products described above may optionally have been modified with isocyanates. Also epoxidized natural oil acrylates such as epoxidized linseed oil acrylate and epoxidized soya acrylate may be used.

The radiation-hardenable compositions also include unsaturated polyethers which contain radiation-hardenable saturated and unsaturated carboxylic acids, such as maleic acid, fumaric acid and adipic acid in co-condensed form such as a copolymer of adipic and acrylic acid.

Reaction products of diisocyanates and polysiocyanates with hydroxy alkyl acrylates and methacrylates can be used as well as other urethanes containing acrylic and methyacrylic acid units. An example is a toluene diisocyanate based acrylate compound. Also other useful oligomers are based on bisphenol A type compounds such as the diglycidyl ether of bisphenol A diacrylate.

Useful acrylate diluents may be those found in the following U.S. Pat. Nos., which patents are incorporated by reference herein.

3,594,410—Cohen et al—July 20, 1971
3,857,822—Frass—Dec. 31, 1974
4,058,443—Murata et al—Nov. 15, 1977
4,088,498—Faust—May 9, 1978
4,177,074—Proskow—Dec. 4, 1979
4,179,478—Rosenkranz et al Dec. 18, 1979
4,180,474—Schuster et al—Dec. 25, 1979

Among the diluents disclosed are polyacrylates and polymethacrylates of polyhydric alcohols such as polyethylene glycol, glycerol, neopentyl glycol, trimethylolpropane, pentaerythritol, etc., and polyacrylates of polyhydric alcohols reacted with alkylene oxide such as with ethylene oxide, i.e., addition products of one mole of trimethylol propane and 2.5 to 4 moles of ethylene oxide. Specific examples are ethylene glycol diacrylate, diethylene glycol diacrylate, neopentyl glycol diacrylate, 1,6-hexane diol diacrylate, trimethylol propane triacrylate and the triacrylate of oxyethylated trimethylol propane of Example I of U.S. Pat. No. 3,594,410.

The diluents or mixtures thereof may be present in the radiation-hardenable mixtures in a proportion of from about 5% to about 80% by weight and preferably in a proportion of from about 10% to 70% by weight based on the total mixture. They are used with both high and low viscosity oligomers. The diluents described above are well known materials and the use of same herein is not limited to any particular diluent.

The radiation-hardenable compositions are useful as coating and impregnating compositions for wood, paper, cardboard, plastics, leather, metals, textiles and ceramic materials.

Test Methods

The test methods used in collecting the data herein are described below and were carried out upon cured coatings upon paper as the substrate.

Adhesion

Follow the cross hatched method using #600 cellotape giving 40 pound per linear inch pull up where the degree of adhesion is a measure of the amount of film left on substrate after the tape is removed from the etched area.

E=Excellent—no removal of film
G=Good—slight removal of film along etched lines
F=Fair—removal of film on etched area
P=Poor—removal of film

Scuff Resistance

An arbitrary measurement using a fingernail and is measured by the resistance to tearing of the coating. This is done by running a fingernail at a 90° angle to the film several times.

G=Good—no marking of film
F=Fair—slight marking
P=Poor—penetration and tearing of film

Solvent Resistance

Use methylethyl ketone as test solvent. Numbers signify the amount of rubs (1 rub=one back and forth motion) with a cotton swab soaked with methylethyl ketone required to etch and penetrate film.

Cure Rate

Using a Fusion Systems ultraviolet curing machine Model No. F440, samples are cured with a 300 watt-/inch bulb suspended two inches from substrate at 100 feet/minute line speed. Samples are repeatedly passed through machine until a non-tacky film is obtained.

Pencil

Use standard pencil hardness kit from Gardner Laboratories with lead ranging from 4B, the softest, to 6H, the hardest. Follow standard methods for testing coatings.

Crease

Crease measured at 90° and 180° bends of the coatings on paper. Degree of performance was measured by the amount of cracking of coating.

E=Excellent—no cracking present
G=Good—only slight cracking of coating allowable
F=Fair—cracking with some peel-off
P=Poor—peel-off of film

Gloss

Gloss is determined using a 60° gloss meter.
G=Good—85-100%
F=Fair—less than 85%

For a fuller understanding of this invention, reference may be made to the following examples. These examples are given merely to illustrate the invention and are not to be construed in a limiting sense.

EXAMPLE I

In order to determine stability of the flatting agent with and without the stabilizer, a stock solution was prepared containing 90 percent by weight of the tetraethoxylate of 2-phenoxyethyl acrylate, a monomer, and 10 percent by weight of the previously described precipitated silica. The silica was slowly added to the monomer making sure that no lumps formed. After all of the silica was added to the monomer the resulting stock solution was mixed for 30 minutes using a high speed mixer until a uniform solution was obtained. The stock solution was then split into two portions and 0.5% by weight of the solution of stabilizer was added to one portion and 1.0% by weight of the solution of stabilizer added to the other. The stock solution was thoroughly mixed until a uniform product was obtained and then observed over a period of time at ambient temperature for silica separation. Heat was used where stabilizers required melting.

Table I summarizes the data obtained with several stabilizers for 50 days and 8 months.

Referring to the fractions in the table, the numerator is the height in centimeters of clear solution, while the denominator is the height in centimeters of the total solution. From this, the percent separation is calculated.

EXAMPLE II

Two formulations were made up having 1% and 3% by weight of the previously described silica. The procedure used was to mix the silica into the lowest viscosity monomer, i.e., the tetraethoxylate of 2-phenoxyethylacrylate, and blend this with a solution of the other components listed in the formulations below. Finally, the photoinitiators and stabilizers were added with mixing. Heat was applied where necessary to obtain a uniform solution.

| Ingredient | Formulations 1. (% By Wt.) | 2. (% By Wt.) |
| --- | --- | --- |
| Tetraethoxylate of 2-phenoxyethyl acrylate (monomer) | 20 | 20 |
| Silica (flatting agent) | 1 | 3 |
| Diglycidyl ether of Bis-phenol A diacrylate (oligomer) | 32 | 32 |
| Tripropoxylate of trimethol propane triacrylate (monomer) | 30 | 28 |
| Tetraethoxylate of Bis-phenol A diacrylate (monomer) | 10 | 10 |
| 2,2'-dimethoxy-2-phenyl acetophenone-Irgacure 651 (photoinitiator) | 4 | 4 |
| Triethanolamine | 2 | 2 |
| Stabilizer | 1 | 1 |
| TOTAL | 100% | 100% |

Samples of the formulations were allowed to stand at ambient temperature for six months with periodic observations for separation.

Tables II and III summarize the data obtained with several stabilizers as indicated.

TABLE I

| Stabilizer | | 50 Day Test Additive % By Wt. | | 8 Month Test Additive % By Wt. | |
| --- | --- | --- | --- | --- | --- |
| Blank | Ht. Clear Soln. (cm) / Ht. Total Soln. (cm) | 0.5 | 1.2/6.0  1.0 | 0.5 | 2.1/6.0  1.0 |
| | Separation | | 20% | | 35% |
| Ethylene diamine condensed with 80 moles oxide and then with 20 moles of ethylene oxide | Ht. Clear Soln. (cm) / Ht. Total Soln. (cm) | 0.3/5.2 | 0.3/5.2 | 0.6/5.2 | 0.6/5.2 |
| | Separation | 5.7% | 5.7% | 11.5% | 11.5% |
| Ethylene diamine condensed with 60 moles of propylene oxide and then with 40 moles of ethylene oxide | Ht. Clear Soln. (cm) / Ht. Total Soln. (cm) | 0.5/5.1 | 0.3/5.0 | 1.0/5.1 | 0.7/5.0 |
| | Separation | 9.8% | 6.0% | 19.6% | 14.0% |
| Oleic hydroxy ethyl imidazoline quaternized with diethyl sulfate | Ht. Clear Soln. (cm) / Ht. Total Soln. (cm) | 1.1/5.0 | 0.8/5.0 | 1.8/5.0 | 1.8/5.0 |
| | Separation | 22% | 16.0% | 36% | 36% |
| N—cetyl-N—ethyl morpholinium ethosulfate | Ht. Clear Soln. (cm) / Ht. Total Soln. (cm) | 0.7/5.0 | 0.5/5.0 | 1.1/5.0 | 1.0/5.0 |
| | Separation | 14% | 10% | 27% | 20.0% |
| Siloxane copolymer of class f above, using Example B | Ht. Clear Soln. (cm) / Ht. Total Soln. (cm) | 0.1/4.9 | 0.1/5.0 | 0.3/4.9 | 0.8/5.0 |
| | Separation | 2.0% | 2.0% | 6.1% | 16.0% |

TABLE II

| | | 6 MONTHS 1% BY WT. SILICA | | |
| --- | --- | --- | --- | --- |
| Stabilizer | Blank | Ethylene diamine condensed with 80 moles of propylene oxide and then with 20 moles of ethylene oxide | Ethylene diamine condensed with 60 moles of propylene oxide and then with 40 moles of ethylene oxide | Siloxane copolymer of class f above, using Example B |
| Ht. Clear Soln. (cm) / Ht. Total Soln. (cm) | 1.5/6.0 | 0.6/5.6 | 1.0/5.7 | 1.0/5.7 |

TABLE II-continued

| | | 6 MONTHS 1% BY WT. SILICA | | |
|---|---|---|---|---|
| Stabilizer | Blank | Ethylene diamine condensed with 80 moles of propylene oxide and then with 20 moles of ethylene oxide | Ethylene diamine condensed with 60 moles of propylene oxide and then with 40 moles of ethylene oxide | Siloxane copolymer of class f above, using Example B |
| Separation | 25% | 10.7% | 17.5% | 17.5% |

TABLE III

| | | 6 MONTHS 3% BY WT. SILICA | | |
|---|---|---|---|---|
| Stabilizer | Blank | Ethylene diamine condensed with 80 moles of propylene oxide and then with 20 moles of ethylene oxide | Ethylene diamine condensed with 60 moles of propylene oxide and then with 40 moles of ethylene oxide | Siloxane copolymer of class f above, using Example B |
| Ht. Clear Soln. (cm) / Ht. Total Soln. (cm) | 0.9/5.9 | 0.4/5.5 | 0.2/5.7 | 0.3/5.7 |
| Separation | 15.3% | 7.3% | 3.5% | 5.3% |

As shown by the following data in Table IV, presence of the stabilizers does not detract from the final properties of the cured coatings.

The coatings were prepared by first applying upon paper as a substrate a 0.27 wet mil film using a No. 3RDS Coating rod and then curing by passing the coating under a Fusion Systems Corp. Model No. F-440 ultraviolet curing machine at a line speed of 100 feet per minute using a 300 watt per inch bulb.

TABLE IV

| EVALUATION OF STABILIZERS IN U.V. CURED FORMULATION (PARTS BY WT.) | | | | | | | | | |
|---|---|---|---|---|---|---|---|---|---|
| Components | A | B | C | D | E | F | G | H | Blank |
| Diglycidyl ether of Bis-phenol A diacrylate | 32 | 32 | 32 | 32 | 32 | 32 | 32 | 32 | 32 |
| Tetraethoxylate of 2-phenoxy-ethyl acrylate | 20 | 20 | 20 | 20 | 20 | 20 | 20 | 20 | 20 |
| Tripropoxylate of trimethyl-olpropane triacrylate | 28 | 30 | 28 | 30 | 28 | 30 | 29 | 31 | 32 |
| Tetraethoxylate of Bis-phenol A diacrylate | 10 | 10 | 10 | 10 | 10 | 10 | 10 | 10 | 10 |
| 2,2'-dimethoxy-2-phenyl-acetophenone | 4 | 4 | 4 | 4 | 4 | 4 | 4 | 4 | 4 |
| Triethanolamine | 2 | 2 | 2 | 2 | 2 | 2 | 2 | 2 | 2 |
| Ethylene diamine condensed with 80 moles of propylene oxide and then with 20 moles of ethylene oxide | 1 | 1 | — | — | — | — | — | — | — |
| Ethylene diamine condensed with 60 moles of propylene oxide and then 40 moles of ethylene oxide | — | — | 1 | 1 | — | — | — | — | — |
| Siloxane copolymer of class f above, using Example B | — | — | — | — | 1 | 1 | — | — | — |
| Silica | 3 | 1 | 3 | 1 | 3 | 1 | 3 | 1 | — |
| Viscosity (cps) | 2300 | 1900 | 2300 | 1850 | 2050 | 1700 | 2050 | 1750 | — |
| Gloss (60°) 0.27 mils. wet film | 67 | 76 | 66 | 68 | 60 | 67 | 46 | 66 | 85 |
| Scuff (paper) | G | G | G | G | G | G | G | G | G |
| Adhesion (paper) | G | G | G | G | G | E | G | G | G |
| Solvent resistance | 100+ | 100+ | 100+ | 100+ | 100+ | 100+ | 100+ | 100+ | — |
| Pencil hardness | 6H | 6H | 6H | 6H | 6H | 6H | 6H | 6H | 6H |
| Crease 90° | E | E | E | E | E | E | E | E | E |
| Crease 180° | G | G | G | G | G | G | G | G | G |

EXAMPLE III

The stability of flatting agent with additional stabilizers was carried out as shown below.

A stock solution was prepared containing 90 percent by weight of the tetraethoxylate of 2-phenoxyethyl acrylate, a monomer, and 10 percent by weight of the previously described precipitated silica. The silica was slowly added to the monomer making sure no lumps formed. After all of the silica was added to the monomer the resulting stock solution was mixed for 30 minutes using a high speed mixer until a uniform solution was obtained. Then stabilizer in an amount of 1.0% by weight of a stock solution was added. The stock solution was thoroughly mixed until a uniform product was obtained and then observed for 60 days at ambient temperature for silica separation. Heat was used where stabilizers required melting.

Table V summarizes the data obtained with several stabilizers for 30 days and 60 days.

TABLE V

| | 30 Days | | 60 Days | |
|---|---|---|---|---|
| Additive | Ht. Clear Soln. (cm) / Ht. Total Soln. (cm) | Separation % | Ht. Clear Soln. (cm) / Ht. Total Soln. (cm) | Separation % |
| Blank | 0.4/4.6 | 8.69 | 0.5/4.6 | 10.9 |
| Siloxane copolymer of class f above using Example B | 0.1/4.5 | 2.3 | 0.15/4.5 | 2.8 |
| Siloxane copolymer of class f above using Example C | 0.2/4.6 | 4.3 | 0.3/4.6 | 6.5 |
| Siloxane copolymer of class f above using Example D | 0.19/4.2 | 4.6 | 0.2/4.2 | 4.7 |
| Siloxane copolymer of class f above using Example E | 0.1/4.4 | 2.3 | 0.2/4.4 | 4.5 |
| Siloxane copolymer of class f above using Example F | 0.15/4.3 | 3.5 | 0.2/4.3 | 4.6 |
| Diethyl sulfate quaternary salt of condensate of cocoamine and 2 moles of ethylene oxide | 0.3/4.7 | 6.4 | 0.4/4.7 | 8.5 |
| Diethyl sulfate quaternary salt of the condensate of tallow amine and 15 moles of ethylene oxide | 0.2/4.6 | 4.3 | 0.3/4.6 | 6.5 |
| Condensate of tallow amine and 2 moles of ethylene oxide | 0.25/4.2 | 5.95 | 0.3/4.2 | 7.1 |
| 1-(2-stearamido ethyl)-2-heptadecyl-3-ethyl imidazolinium ethosulfate | 0.3/4.8 | 6.3 | 0.45/4.8 | 9.4 |
| Diethyl sulfate quaternary salt of $C_{16}$ dimethyl amine | 0.15/3.9 | 3.8 | 0.2/3.9 | 5.1 |
| Benzyl chloride quaternary salt of $C_{12}$ dimethyl amine | 0.3/4.8 | 6.3 | 0.45/4.8 | 9.4 |

Although the expression, radiation-hardenable, has been used throughout to describe the compositions therein, these compositions can also be described by the expression, radiation-curable, and it is the intent that both expressions be used interchangeably.

While the invention has been described with reference to certain specific embodiments thereof, it is understood that it is not to be limited since alterations and changes may be made therein which are within the full intended scope of the appended claims.

What is claimed is:

1. In a radiation hardenable composition containing at least one radiation-hardenable oligomer and at least one flatting agent, at least one stabilizer present in an amount sufficient to reduce settling of said flatting agent, said stabilizer being alkylene oxide adducts of siloxane copolymers having the following structure:

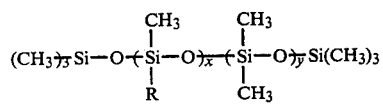

where x is about 3, y is about 11, the siloxane backbone has a molecular weight of about 1,000 and constitutes about 20% by weight of the total molecule, R is $-CH_2-CH_2-O+CH_2CH_2-O)_{\overline{a}}$

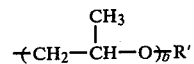

where a and b are present in a ratio of about 1:1, R has a molecular weight of about 1200 and R' is H.

2. The composition of claim 1 where there is present from about 0.1% to about 5.0% by weight of stabilizer based upon the weight of the total radiation-hardenable composition.

* * * * *